(12) United States Patent
Kitchen

(10) Patent No.: US 7,716,974 B2
(45) Date of Patent: May 18, 2010

(54) APPARATUS AND METHOD FOR TESTING A BRAKE ROTOR

(75) Inventor: Willard Kitchen, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 198 days.

(21) Appl. No.: 12/047,672

(22) Filed: Mar. 13, 2008

(65) Prior Publication Data

US 2009/0229357 A1    Sep. 17, 2009

(51) Int. Cl.
    *G01M 17/00*    (2006.01)
(52) U.S. Cl. ........................................................ 73/121
(58) Field of Classification Search .............. 73/117.01, 73/121, 128, 129, 130
    See application file for complete search history.

(56) References Cited

U.S. PATENT DOCUMENTS

| | | | | |
|---|---|---|---|---|
| 4,213,332 A | * | 7/1980 | Bonomo et al. .......... | 73/862.14 |
| 4,606,434 A | * | 8/1986 | Vasilow et al. .......... | 188/1.11 L |
| 4,606,435 A | * | 8/1986 | Johnson ................... | 188/1.11 L |
| 5,974,878 A | * | 11/1999 | Newell et al. ................. | 73/462 |
| 6,874,380 B2 | * | 4/2005 | Knerr ........................ | 73/865.8 |
| 7,222,521 B1 | | 5/2007 | Smith et al. | |
| 7,437,917 B1 | * | 10/2008 | McNaughton et al. ........ | 73/121 |
| 2004/0159168 A1 | * | 8/2004 | Knerr ........................ | 73/865.8 |

\* cited by examiner

*Primary Examiner*—Eric S McCall
(74) *Attorney, Agent, or Firm*—Young Basile

(57) ABSTRACT

An apparatus or method for testing a brake rotor that is mounted on a hub for rotation with respect to a caliper housing. The apparatus includes a bracket having a first end and a second end. A first attachment member and a second attachment member are connected to the bracket and configured to engage the caliper housing. A first sensor is connected to the first end of the bracket for engagement with a first side of the brake rotor. A second sensor is connected to the second end of the bracket for engagement with a second side of the brake rotor.

17 Claims, 5 Drawing Sheets

APPARATUS AND METHOD FOR TESTING A BRAKE ROTOR

FIELD OF THE INVENTION

The invention relates to the field of measuring characteristics of brake rotors.

BACKGROUND

To ensure safety and to provide a comfortable driving experience, automotive disc brake systems must operate smoothly and predictably. However, when disc brake system components do not meet tolerances or become damaged through use, the driver of a vehicle may experience uncomfortable sensations such as brake judder, steering wheel shimmy or vehicle body vibration, and performance of the disc brake system may be compromised. Accordingly, initial quality control of brake system components and subsequent maintenance of those components are crucial to providing a safe and comfortable driving experience.

Conventional disc brake systems for vehicles include a hardened metal brake rotor that rotates with a wheel of the vehicle and a pair of high-friction brake pads that are fixed with respect to the vehicle such that they do not rotate with the wheel. In order to slow the vehicle, the brake pads are disposed on opposite sides of the rotor, and are brought into engagement with the rotor by a caliper.

Brake rotor abnormalities are a significant source of disc brake system problems. The two primary brake rotor abnormalities are run out and thickness variation. Run out refers to the amount by which the surface of the brake rotor deviates from a single plane perpendicular to the axis of rotation of the wheel when the brake rotor is rotated. Thickness variation refers to the amount by which the distance between opposite sides of the brake rotor varies at different locations on the brake rotor.

Conventionally, brake rotor run out measurements are made using a linear displacement measurement tool, such as a dial gauge. One known run out measuring method includes the steps of placing the vehicle on a lift and removing the wheel of the vehicle corresponding to the brake rotor to be measured. The technician performing the measurement places the dial gauge into engagement with a first side of the brake rotor, for example, by supporting the dial gauge with respect to the vehicle using an adjustable support arm that magnetically attaches to a portion of the vehicle. The technician then records measurements at discrete locations on the brake rotor while rotating the brake rotor slightly in between measurements, until measurements have been recorded for a full rotation of the brake rotor. After the run out of the first side of the brake rotor is measured, the dial gauge is repositioned so that it engages a second side of the brake rotor, and the process is repeated. Thickness variation is measured at numerous locations on the brake rotor using a micrometer while the vehicle is on the lift and the wheel is removed.

The above-described testing procedure has been previously refined by using a pair of electronic sensors that measure both sides of the brake rotor at once and automatically output measurements to a data recording device, such as a portable computer. This refined measuring method includes the steps of placing the vehicle on a lift and removing the wheel of the vehicle corresponding to the brake rotor to be measured. In addition, the brake caliper and the caliper mounting bracket are removed to provide clearance for a sensor mounting bracket. The brake rotor is then rotated, and the sensors transmit data regarding the surface characteristics of the brake rotor to the computer. Since sensors are placed on both sides of the brake rotor, run out and thickness are measured simultaneously.

While conventional brake rotor testing methods provide accurate run out and thickness measurements, they are time consuming, due to the need to remove the wheel and, in some methods, due to the need to remove the brake caliper and the brake caliper mounting bracket. It would be desirable to provide a method and apparatus for testing a brake rotor that could provide accurate run out and thickness measurements without removing the wheel or brake caliper from the vehicle.

SUMMARY

The disclosed embodiments include an apparatus and method for testing a brake rotor that is mounted on a hub of a vehicle for rotation with respect to a brake caliper housing. In one embodiment, the apparatus includes a bracket having a first end and a second end, a first attachment member connected to the first end of the bracket, and a second attachment member connected to the second end of the bracket. The first attachment member engages the first side of the caliper housing, while the second attachment member engages the second side of the caliper housing. A first sensor is connected to the bracket for engagement with a first side of the brake rotor, and a second sensor connected to the bracket for engagement with a second side of the brake rotor. At least a portion of the bracket is configured to be disposed between the caliper housing and a wheel that is mounted to the hub. Furthermore, the bracket is configured to be moved between an uninstalled position, wherein the first and second attachment members do not engage the caliper housing, and an installed position, wherein the first and second attachment members engage the caliper housing, while a wheel is mounted to the hub.

In some embodiments, the first sensor and the second sensor of the apparatus may each be connected to the bracket at a radially adjustable position with respect to the brake rotor. Furthermore, the bracket may be configured to connect each of the first sensor and the second sensor to the bracket in at least three discrete radial positions with respect to first and second sides of the brake rotor, respectively.

In other embodiments of the apparatus, the first sensor may extend substantially perpendicular to the first side of the brake rotor and the second sensor may extend substantially perpendicular to the second side of the brake rotor. Furthermore, the first sensor and the second sensor may be linear displacement sensors.

In another embodiment, the method includes the steps of providing a vehicle having a hub with a brake rotor and a wheel mounted thereto for rotation with respect to a caliper housing, and connecting a bracket to the caliper housing by engaging a first attachment member connected to the bracket with a first side of the caliper housing and by engaging a second attachment member connected to the bracket with a second side of the caliper housing while the wheel remains mounted to the hub. The method further includes the steps of providing a first sensor and a second sensor on the bracket, measuring at least one characteristic of the brake rotor by engaging the first sensor with a first side of the brake rotor and engaging the second sensor with a second side of the brake rotor, and disconnecting the bracket from the caliper housing after measuring the at least one characteristic of the brake rotor.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
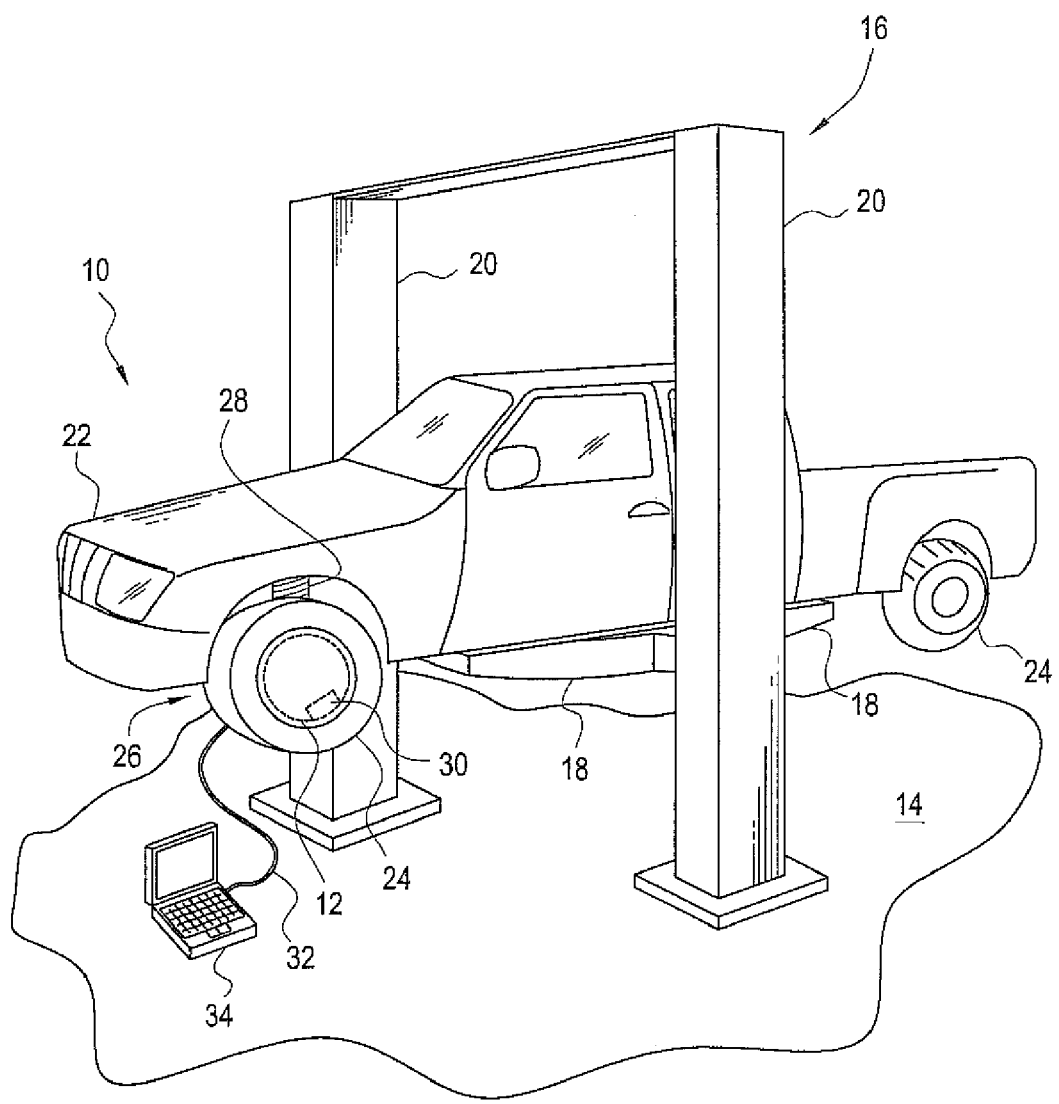
FIG. 1 is an illustration showing a vehicle positioned on a hydraulic lift during brake rotor testing according to the invention.

FIG. 1 shows a vehicle 10 having at least one disc brake rotor 12 that is being tested according to the method of the invention. The vehicle 10 is suspended above a floor 14 using a hydraulic vehicle lift 16 having vehicle engaging portions 18 that are vertically moveable with respect to a pair of support columns 20. The vehicle engaging portions 18 of the hydraulic lift 16 engage a body 22 of the vehicle 10 to move the vehicle 10 between a lowered position, where a plurality of wheels 24 of the vehicle 10 are in contact with the floor 14, and a raised position, where the plurality of wheels 24 of the vehicle 10 are suspended with respect to the floor 14. However, it should be noted that all of the wheels 24 need not be suspended with respect to the floor 14, but rather, the method could be practiced as long as the wheel 24 corresponding to the brake rotor 12 that is being measured is suspended.

When the vehicle 10 is in the raised position on the vehicle lift 16, an inboard side 26 of each wheel is accessible, and a suspension system 28 of the vehicle 10 is in an unloaded condition, causing the wheel 24 to drop with respect to the body 22 of the vehicle 10, thus facilitating installation of a measurement tool or apparatus 30 for testing the brake rotor 12. In order to store data regarding the brake rotor 12 during the test, a communications cable 32 connects the measurement tool 30 to a computer 34 to provide electrical communication between the apparatus 30 and the computer 34. The computer 34 may be a laptop computer, a dedicated data collection computer, or any other conventional computer having, for example, a processor, a random access memory module, and a storage medium. The computer 34 further includes conventional data collection software that is stored in the storage medium and may be executed by the processor to cause the computer 34 to receive signals from the measurement tool 30 and store those signals in the storage medium.

Figure 2:
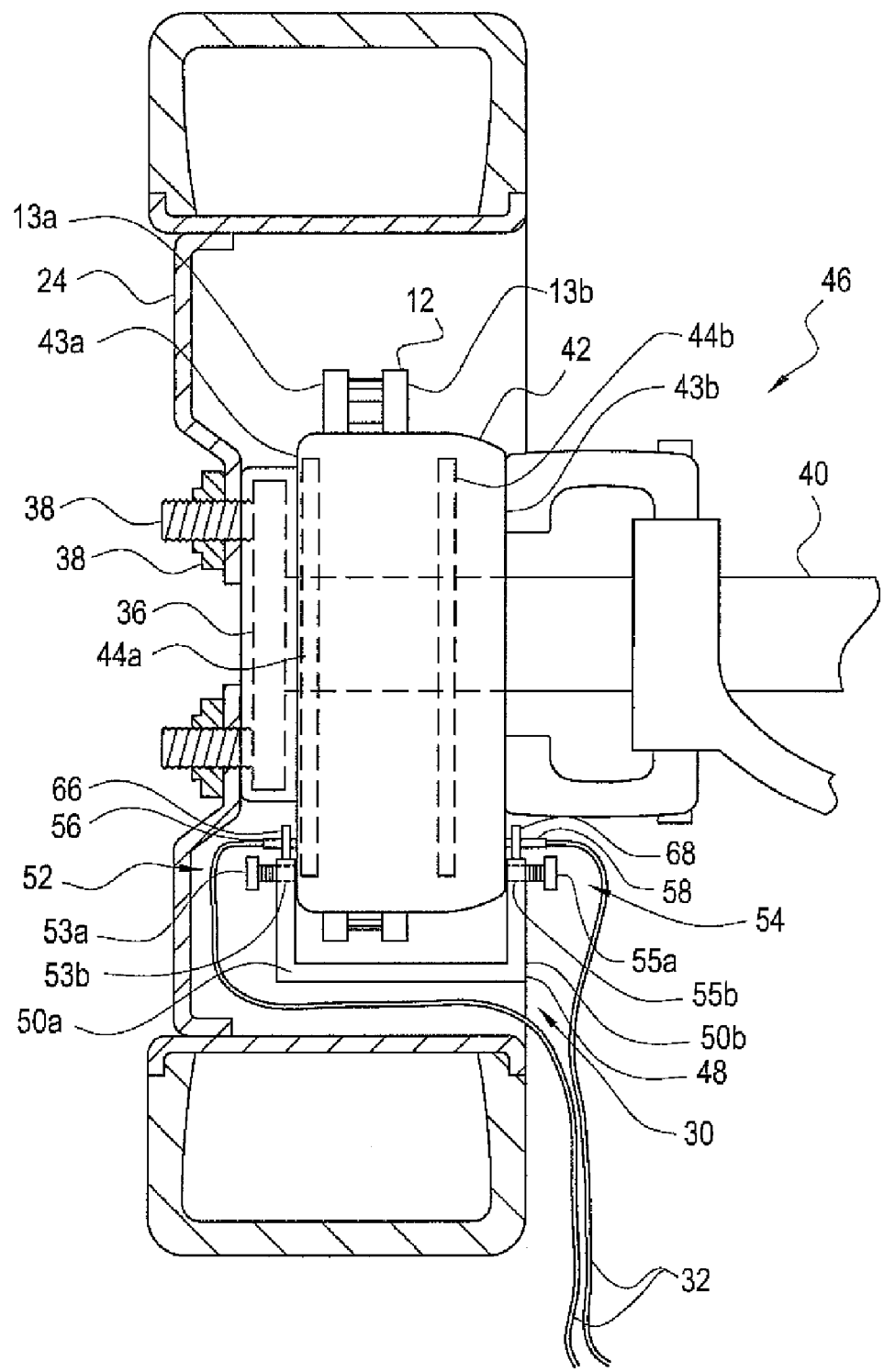
FIG. 2 is a partial cross-section view showing a brake rotor testing apparatus installed on a brake rotor while a wheel of the vehicle is disposed on a hub of the vehicle.

As shown in FIG. 2, the measurement tool 30 is installed on the brake rotor 12 while the wheel 24 of the vehicle 10 remains connected to a hub 36 by conventional fasteners 38. The hub 36 is connected to the vehicle 10 for rotation with respect to the vehicle 10. For example, the hub 36 may be connected to an axle 40 of the vehicle 10. As is conventional, a brake caliper housing 42 is positioned so that it straddles the brake rotor 12, so that a first brake pad 44a and a second brake pad 44b, which are disposed within the brake caliper housing 42, are disposed adjacent to a first side 13a and a second side 13b of the brake rotor 12, respectively. The brake caliper housing 42 is connected to the vehicle 10 by a caliper mounting bracket 46 that removably mounts the brake caliper housing 42 to with respect to the brake rotor 12, such that the brake rotor 12 may rotate relative to the brake caliper housing 42. However, as with the wheel 24, the brake caliper housing 42 remains mounted in its operative position with respect to the brake rotor 12 while the measurement tool 30 is installed.

So that the measurement tool 30 may measure at least one characteristic of each of the first side 13a and the second side 13b of the brake rotor 12, the measurement tool 30 includes a bracket 48 that supports a first sensor 56 and a second sensor 58 with respect to the brake rotor 12.

The first sensor 56 and the second sensor 58 are provided at a first end 50a and a second end 50b of the bracket 48, respectively. The first sensor 56 is held in an operative position with respect to the first side 13a of the brake rotor 12 by the bracket 48, while the second sensor 58 is held in an operative position with respect to the second side 13b of the brake rotor 12 by the bracket 48. The first and second sensors 56, 58 determine the distance between the first and second sides 13a, 13b of the brake rotor 12 and the first and second sensors 56, 58 which transmitted to the computer 34 over the communications cable 32 and recorded in either absolute or relative terms. Thus, the first and second sensors 56, 58 may be contact sensors operative to transmit a signal to the computer 34 via the communications cable 32 corresponding to the relative position of the portion of the brake rotor 12 with which the sensor 56, 58 is engaged, such as a conventional linear variable displacement transducers (LVDT). However, the first and second sensors 56, 58 need not be contact sensors, but rather, may be any sensor operative to produce a signal corresponding to the position and surface variations of the first side 13a and the second side 13b of the brake rotor 12. Thus, as another example, the first and second sensors 56, 58 could be optical sensors, such as laser sensors, infrared sensors, or video-based sensors, operable to produce a signal corresponding to the distance between the sensors 56, 58 and the first and second sides 13a, 13b of the brake rotor 12.

In order to support the bracket 48 with respect to the vehicle 10, a first attachment member 52 is provided at the first end 50a of the bracket 48, and a second attachment member 54 is provided at the second end 50b of the bracket 48. The first attachment member 52 is selectively engageable with a first side 43a of the brake caliper housing 42, while the second attachment member 54 is selectively engageable with a second side 43b of the brake caliper housing 42. The first and second attachment members 52, 54 allow the measurement tool 30 to be rigidly connected to the caliper housing 42 while the wheel 24 of the vehicle 10 remains mounted to the hub 36, by moving between an uninstalled position, where the first and second attachment members 52, 54 do not engage the caliper housing 42, and an installed position where the first attachment member 52 engages the first side 43a of the caliper housing 42 and the second attachment member 54 engages the second side 43b of the caliper housing 42. It should be understood that although first and second attachment members 52, 54 are described herein, the bracket 48 could be supported by a single attachment member 52, 54.

The first attachment member 52 may include a first plurality of fasteners 53a that extend through a first plurality of apertures 53b that are provided on the bracket 48. Similarly, the second attachment member 54 may include a second plurality of fasteners 55a that extend through a second plurality of apertures 55b that are provided on the bracket 48. The fasteners 53a, 55a are conventional fasteners, such as socket cap screws or thumb screws. As an alternative, the fasteners 53a, 55a and the apertures 55b, 55b could be provided for only one of the attachment members 52, 54. For example, the first attachment member 52 could include the fasteners 53a and the apertures 55a while the second attachment member 54 could be a portion of the bracket 48 itself that is urged into engagement with the second side 43b of the caliper housing 42 by the fasteners 53a and the apertures 55a of the first attachment member 52. However, the first and second attachment members 52, 54 need not include fasteners 53a, 55a or apertures 53b, 55b, but rather, first and second attachment members 52, 54 may be any structures operative to rigidly secure the bracket 48 in a fixed position with respect to the brake caliper housing 42, including, but not limited to clamps or magnets. Furthermore, the first attachment member 52 and the second attachment member 54 may be fabricated either integral to or separately from the bracket 48, and out of any suitable material.

Figure 3:
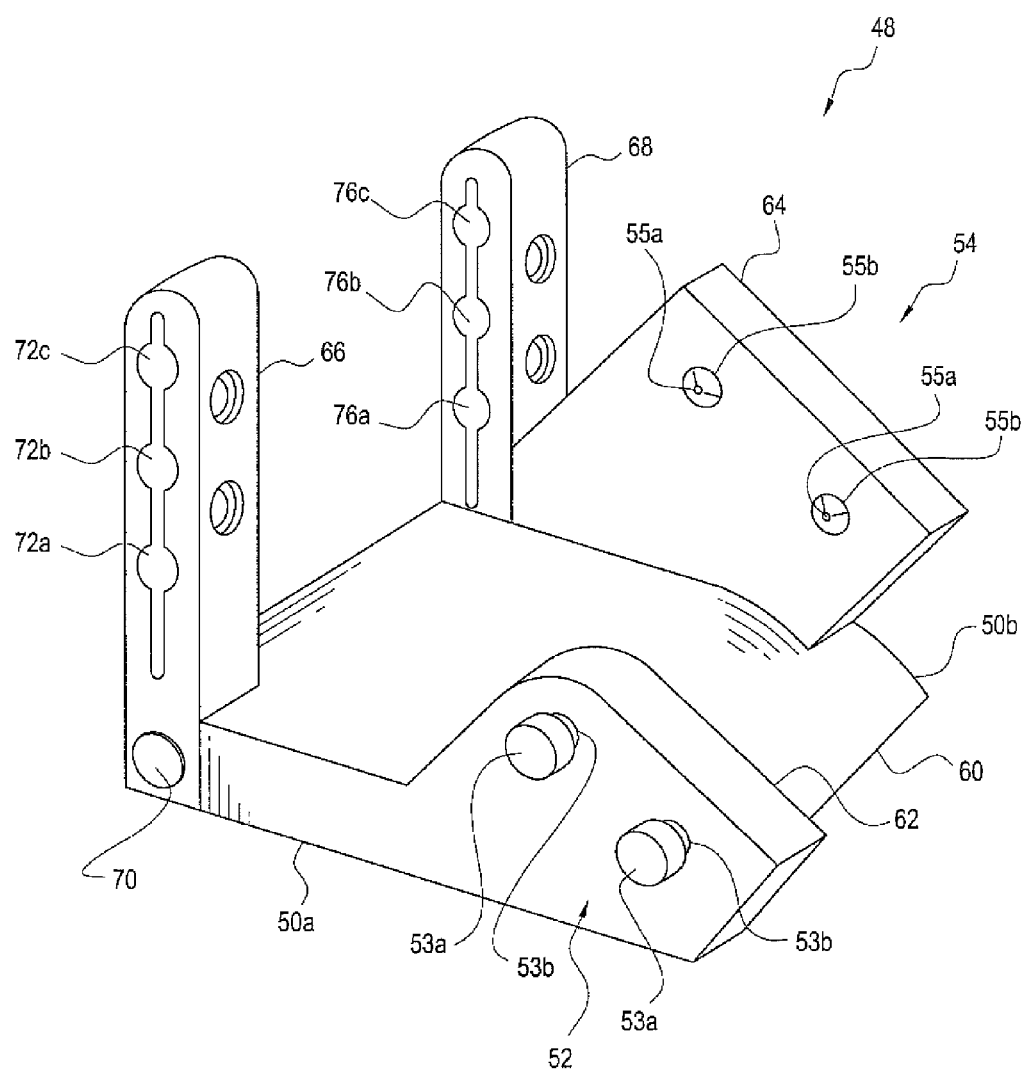
FIG. 3 is a perspective view of a bracket of a measuring tool according to the invention.

The bracket 48 is a substantially u-shaped metal body that may be fabricated as an integral body or from separate portions connected to each other either permanently or detachably. As seen in FIG. 3, the bracket 48 has a plate-like base member 60 that extends from the first end 50a of the bracket 48 to the second end 50b of the bracket 48. The base member 60 of the bracket 48 is dimensioned to span the width of the brake rotor 12 and the caliper housing 42, and thus, the base member 60 forms the bottom of the substantial u-shape of the bracket 48. The bracket 48 also includes a first mounting member 62 that is connected to the base member 60 at the first end 50a of the bracket 48 and a second mounting member 64 that is connected to the base member 60 at the second end 50b of the bracket 48. The first mounting member 62 and the second mounting member 64 are substantially planar, and each extends substantially perpendicular to the base member 60. The first plurality of apertures 53b are formed through the first mounting member 62 for receiving the first plurality of fasteners 53a. The second plurality of apertures 55b are formed through the second mounting member 64 for receiving the second plurality of fasteners 55a.

To allow adjustable positioning of the first sensor 56 and the second sensor 58 with respect to the first side 13a and the second side 13b of the brake rotor 12, respectively, the bracket 48 has a first sensor mount 66 and a second sensor mount 68. The first sensor mount 66 is disposed at the first end 50a of the bracket 48 so that the first sensor 56 may be disposed in an operative position for measuring at least one characteristic of the first side 13a of the brake rotor 12, while the second sensor mount 68 is provided at the second end 50b of the bracket 48 so that the second sensor 58 may be disposed in an operative position for measuring at least one characteristic of the second side 13b of the brake rotor 12.

The first sensor mount 66 is a generally upstanding beam, post or rod-like member that extends substantially perpendicular to the base member 60. The first sensor mount 66 may be formed integrally with the base member 60, or may be removably connected to the base member 60 by a fastener 70, such as a bolt or screw. A first plurality of sensor mounting locations 72a, 72b, 72c are formed on the first sensor mount 66, namely an outer sensor mounting location 72a, an intermediate sensor mounting location 72b and an inner sensor mounting location 72c, where the outer sensor mounting location 72a is closest to the base member 60 and the inner sensor mounting location 72c is furthest from the base member 60. The first sensor 56 is selectively receivable in any of the outer sensor mounting location 72a, the intermediate sensor mounting location 72b and the inner sensor mounting location 72c, thus providing at least three discrete mounting locations for the first sensor 56. However, it should be understood that fewer mounting locations or more mounting locations for the first sensor 56 could be provided on the first sensor mount 66, or alternatively, the first sensor 56 could be mounted to the first sensor mount 66 for continuous adjustment of the spacing between the base member 60 and the first sensor 56.

The second sensor mount 68 is a generally upstanding beam, post or rod-like member that extends substantially perpendicular to the base member 60. The second sensor mount 68 may be formed integrally with the base member 60, or may be removably connected to the base member 60 by a fastener 74 (seen in FIG. 5), such as a bolt or screw. A second plurality of sensor mounting locations 76a, 76b, 76c are formed on the second sensor mount 68, namely an outer sensor mounting location 76a, an intermediate sensor mounting location 76b and an inner sensor mounting location 76c, where the outer sensor mounting location 76a is closest to the base member 60 and the inner sensor mounting location 76c is furthest from the base member 60. The second sensor 58 is selectively receivable in any of the outer sensor mounting location 76a, the intermediate sensor mounting location 76b and the inner sensor mounting location 76c to allow for radial adjustment of the position of the second sensor 58 with respect to the second side 13b of the brake rotor 12. Thus, the second sensor mount 68 provides at least three discrete mounting locations for the second sensor 58. However, it should be understood that fewer mounting locations or more mounting locations for the second sensor 58 could be provided on the second sensor mount 68, or alternatively, the second sensor 58 could be mounted to the second sensor mount 68 for continuous adjustment of the spacing between the base member 60 and the second sensor 58.

Figure 4:
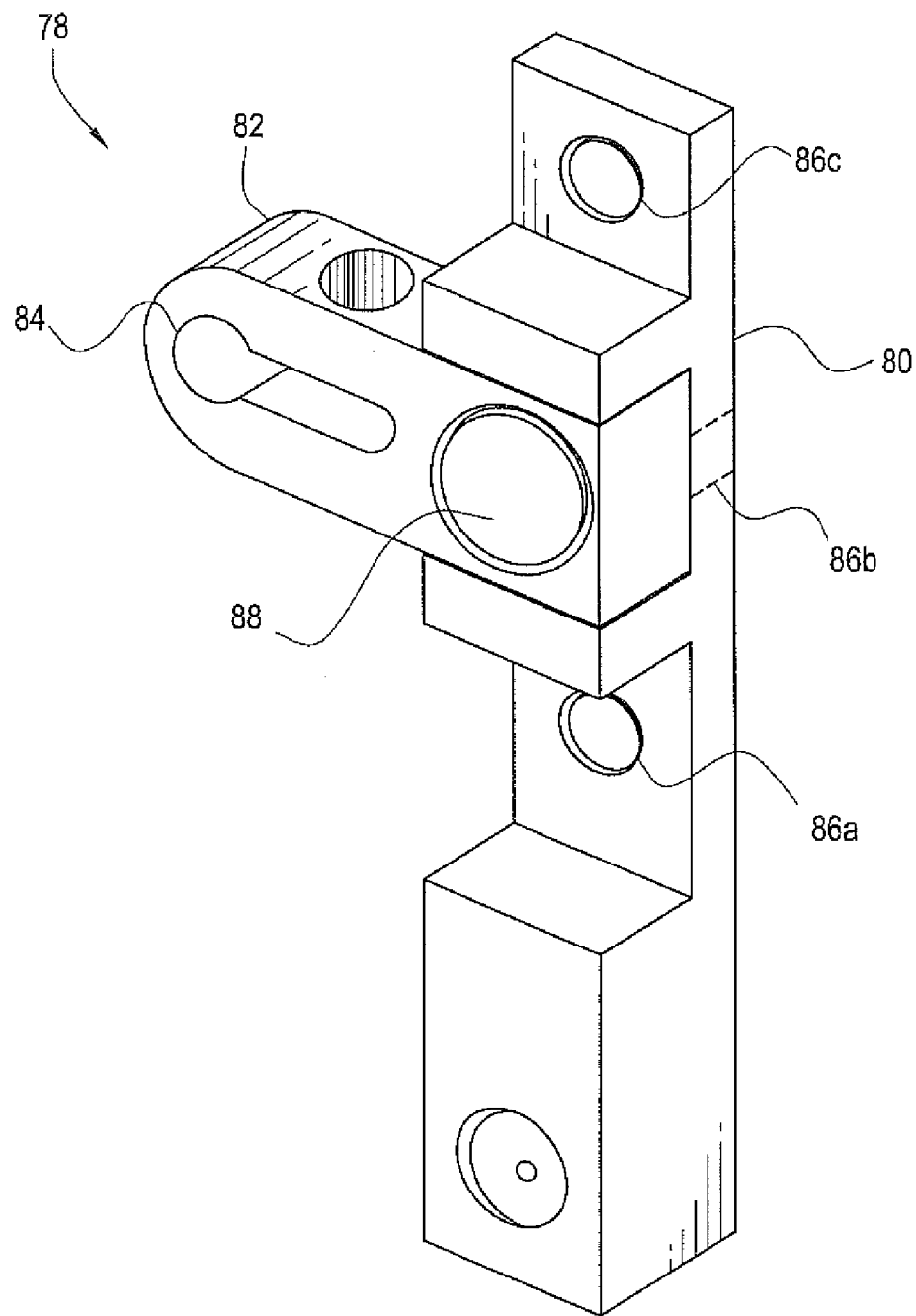
FIG. 4 is a perspective view of an alternative sensor mount of the bracket.

It should be understood that the particular geometric configuration of the sensor mounts 66, 68 is not necessarily limited to the configurations shown and described herein, but rather, the sensor mounts 66, 68 may be provided in any geometric configuration that is suited to the vehicle 10 that the measurement tool 30 is being used on. By way of example, a two-piece sensor mount 78 could be provided having a first portion 80 and a second portion 82 that is adjustably connectable to the first portion 80, as shown in FIG. 4. Similar to the first sensor mount 66 and the second sensor mount 68, the first portion 80 of the two-piece sensor mount 78 may be formed integrally with the base member 60, or may be removably connected to the base member 60 by a fastener (not shown). A plurality of apertures, namely an outer mounting aperture 86a, an intermediate mounting aperture 86b and an inner mounting aperture 86c are provided on the first portion 80 of the two-piece sensor mount 78. The second portion 82 of the two-piece sensor mount 78 includes a sensor holder 84 that is operative to receive either the first sensor 56 or the second sensor 58 at a laterally spaced location with respect to the first portion 80 of the two-piece sensor mount 78. In particular, the second portion 82 of the two-piece sensor mount 78 may be connected to the first portion 80 of the two-piece sensor mount 78 at any of the outer mounting aperture 86a, the intermediate mounting aperture 86b or the inner mounting aperture 86c by a fastener 88 to provide a variable spacing between the second portion 80 of the two-piece sensor mount 78 and the base member 60 of the bracket 48. Furthermore, when the second portion 82 of the two-piece sensor mount 78 is connected to the first portion 80, the second portion 82 extends substantially perpendicular to the first portion 80.

Figure 5:
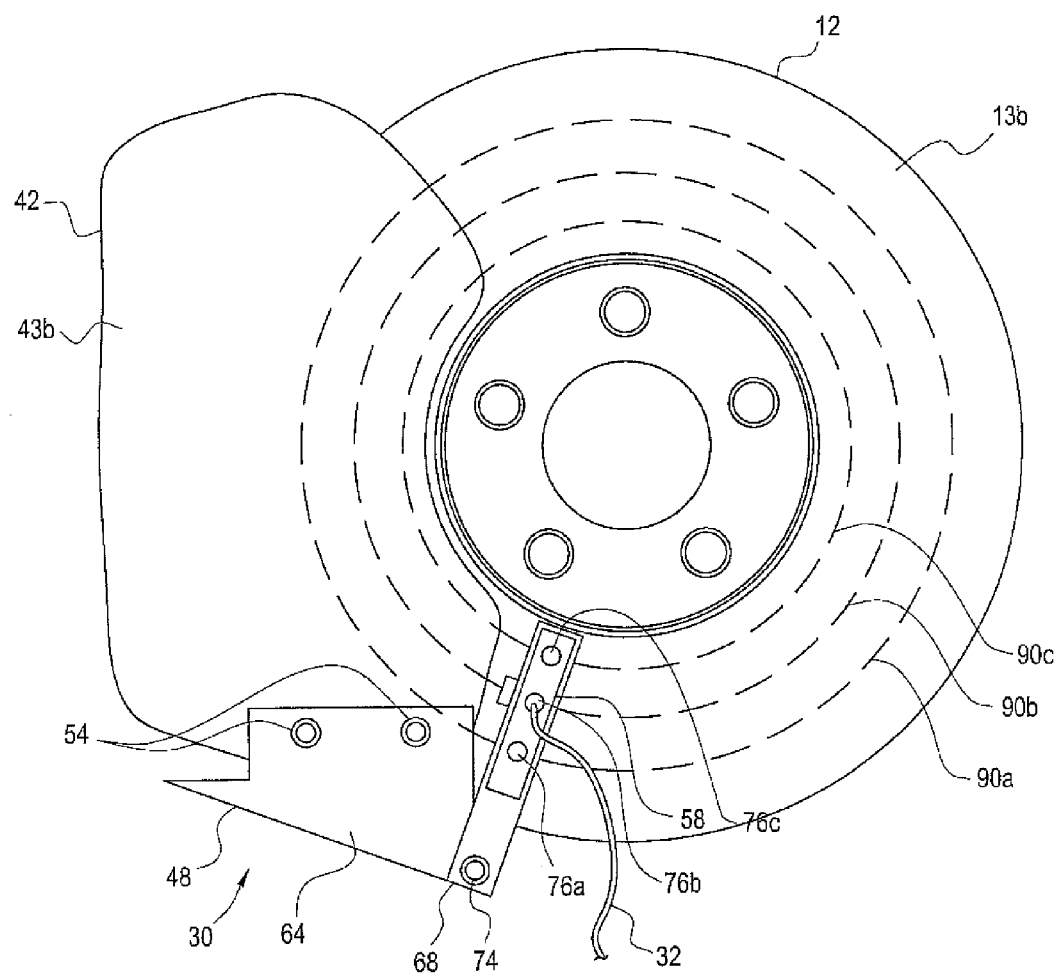
FIG. 5 is a side view showing the brake rotor, a brake caliper housing, and the measurement tool.

Provision of the plurality of sensor mounting locations 72a, 72b, 72c on the first sensor mount 66 and the plurality of sensor mounting locations 76a, 76b, 76c on the second sensor mount 68 allows measurements to be taken along a plurality of substantially circular measurement paths 90a, 90b, 90c that are defined on the first side 13a of the brake rotor 12 and the second side 13b of the brake rotor 12, as shown in FIG. 5, where the second side 13b of the brake rotor 12 is shown as representative of both sides 13a, 13b of the brake rotor 12 and the second sensor mount 68 is shown as representative of both of the sensor mounts 66, 68. When the second sensor 58 is installed in the outer sensor mounting location 76a of the second sensor mount 68, measurements of the second side 13b of the brake rotor 12 may be taken along an outer measurement path 90a. When the second sensor 58 is installed in the intermediate sensor mounting location 76b of the second sensor mount 68, measurements of the second side 13b of the brake rotor 12 may be taken along an intermediate measurement path 90b. When the second sensor 58 is installed in the inner sensor mounting location 76c of the second sensor mount 68, measurements of the second side 13b of the brake rotor 12 may be taken along an inner measurement path 90c.

In use, a technician may measure one or more characteristics of the brake rotor 12, such as the thickness or run out, using the measurement tool 30. To do so, the technician first moves the vehicle 10 to a raised position using the vehicle lift 16, thus providing access to the inboard side 26 of the wheel 24 of the vehicle 10. The technician then installs the first sensor 56 onto the bracket 48 of the measurement tool 30 by connecting the first sensor 56 to one of the sensor mounting locations 72a, 72b, 72c on the first sensor mount 66, as desired. Next, the technician installs the second sensor 58 onto the bracket 48 of the measurement tool 30 by connecting the second sensor 58 to one of the sensor mounting locations 76a, 76b, 76c on the second sensor mount 68, typically by selecting the sensor mounting location 76a, 76b, 76c on the second sensor mount 68 that corresponds to the sensor mounting location 72a, 72b, 72c on the first sensor mount 66 where the first sensor 56 was installed. Once the sensors 56, 58 are connected to the bracket 48, the communications cables 32 are connected to the sensors 56, 58 and the computer 34.

The technician next connects the measurement tool 30 to the caliper housing 42. To do this, the technician places the bracket 48 of the measurement tool 30 over the caliper housing 42 and the brake rotor 12, such that at least a portion of the bracket 48 is disposed between the rotor 12 and the wheel 24. In particular, the first sensor mount 66 is disposed between the rotor 12 and the wheel 24, while the first mounting member 62 is disposed between the caliper housing 42 and the wheel 24. At this point, the first mounting member 62 is adjacent to a first side 43a of the caliper housing 42, the second mounting member 64 is adjacent to the second side 43b of the caliper housing 42, and the first and second attachment members 52, 54 are in an uninstalled position, where the first and second attachment members 52, 54 do not engage the caliper housing 42. The technician then moves the attachment members 52, 54 from the uninstalled position to the installed position by engaging the first attachment member 52 with the first side 43a of the caliper housing 42 and engaging the second attachment member 54 with the second side 43b of the caliper housing 42, thus rigidly connecting the measurement tool 30 to the caliper housing 42 while the wheel 24 of the vehicle 10 remains mounted to the hub 36.

After the measurement tool 30 is connected to the caliper housing 42, the technician may begin measuring the brake rotor 12. While the computer 34 is receiving and storing data from the first sensor 56 and the second sensor 58, the technician rotates the wheel 24 so that the sensors 56, 58 travel along the measurement path 90a, 90b, 90c corresponding to the mounting locations 72a, 72b, 72c, 76a, 76b, 76c where the sensors 56, 58 are installed. As the sensors 56, 58 detect data corresponding to the characteristics of the brake rotor 12, such as thickness and run out, the data is transmitted to the computer 34 over the communications cable 32. The technician stops rotating the wheel 24 after at least one full rotation has been made. Next, the technician disconnects the measurement tool 30 from the caliper housing 42 by moving the attachment members 52, 54 to the uninstalled position. The technician may then move the sensors 56, 58 to different mounting locations 72a, 72b, 72c, 76a, 76b, 76c and repeat the procedure until measurements are obtained from all desired mounting locations 72a, 72b, 72c, 76a, 76b, 76c.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for testing a brake rotor, wherein the brake rotor is mounted on a hub for rotation with respect to a caliper housing, the apparatus comprising:
   a bracket having a first end and a second end;
   a first attachment member connected to the bracket and configured to engage the caliper housing;
   a first sensor connected to the bracket for engagement with a first side of the brake rotor;
   a second sensor connected to the bracket for engagement with a second side of the brake rotor;
   the first attachment member connected to the bracket at the first end thereof and configured to engage a first side of the caliper housing; and
   a second attachment member connected to the bracket at the second end thereof and configured to engage a second side of the caliper housing.

2. The apparatus of claim 1, wherein the bracket includes a first sensor mount and a second sensor mount, the first sensor is connected to the first sensor mount and the second sensor is connected to the second sensor mount.

3. The apparatus of claim 1, wherein at least a portion of the bracket is configured to be disposed between the caliper housing and a wheel that is mounted to the hub.

4. The apparatus of claim 1, wherein the bracket is configured to be moved between an uninstalled position, wherein the first and second attachment members do not engage the caliper housing, and an installed position, wherein the first and second attachment members engage the caliper housing, while a wheel is mounted to the hub.

5. The apparatus of claim 1, wherein the first sensor and the second sensor are each connected to the bracket at a radially adjustable position with respect to the brake rotor.

6. The apparatus of claim 1, wherein the bracket is configured to connect each of the first sensor and the second sensor to the bracket in at least three discrete radial positions with respect to the brake rotor.

7. The apparatus of claim 1, wherein the first sensor extends substantially perpendicular to the first side of the brake rotor and the second sensor extends substantially perpendicular to the second side of the brake rotor.

8. The apparatus of claim 1, wherein the first sensor and the second sensor are linear displacement sensors.

9. An apparatus for testing a brake rotor, wherein the brake rotor is mounted on a hub for rotation with respect to a caliper housing, the apparatus comprising:

a base member having a first end and a second end;

a first mounting member connected to the base portion at the first end thereof, the first mounting member extending substantially perpendicular to the base member;

a second mounting member connected to the base portion at the second end thereof, the second mounting member extending substantially perpendicular to the base member and spaced from the first mounting member by the base member;

a first attachment member connected to the first mounting member and configured to engage a first side of the caliper housing;

a second attachment member connected to the second mounting member and configured to engage a second side of the caliper housing;

a first sensor mount connected to the base member at the first end thereof the first sensor mount extending substantially perpendicular to the base member and having a first plurality of mounting locations formed thereon;

a second sensor mount connected to the base member at the second end thereof, the second sensor mount extending substantially perpendicular to the base member; spaced from the first sensor mount by the base member, and having a second plurality of mounting locations formed thereon;

a first sensor connected to the first sensor mount at a mounting location of the first plurality of mounting locations for engagement with a first side of the brake rotor; and a second sensor connected to the second sensor mount at a mounting location of the second plurality of mounting locations for engagement with a second side of the brake rotor.

10. The apparatus of claim 9, wherein the first attachment member includes at least a first aperture formed though the first mounting member and at least a first fastener configured to extend through the first aperture and engage the first side of the caliper housing, and the second attachment member includes at least a second aperture formed through the second mounting member and at least a second fastener configured to extend though the second aperture and engage the second side of the caliper housing.

11. The apparatus of claim 9, wherein the base member, the first mounting member and the second mounting member are formed integrally.

12. The apparatus of claim 9, wherein the first sensor mount and the second sensor mount are detachably connected to the base member.

13. The apparatus of claim 9, wherein at least a portion of at least one of the base member, the first mounting member or the second mounting member is configured to be disposed between the caliper housing and a wheel that is mounted to the hub.

14. The apparatus of claim 9, wherein the base member, the first mounting member and the second mounting member are configured to be moved between an uninstalled position, wherein the first and second attachment members do not engage the caliper housing, and an installed position, wherein the first and second attachment members engage the caliper housing, while a wheel is mounted to the hub.

15. The apparatus of claim 9, wherein the first sensor extends substantially perpendicular to the first side of the brake rotor and the second sensor extends substantially perpendicular to the second side of the brake rotor.

16. The apparatus of claim 9, wherein the first sensor and the second sensor are linear displacement sensors.

17. A method for testing brake rotor valiance, comprising:

providing a vehicle having a hub with a brake rotor and a wheel mounted thereto for rotation with respect to a caliper housing;

connecting a bracket to the caliper housing by engaging a first attachment member connected to the bracket with a first side of the caliper housing and by engaging a second attachment member connected to the bracket with a second side of the caliper housing while the wheel remains mounted to the hub;

providing a first sensor and a second sensor on the bracket;

measuring at least one characteristic of the brake rotor by engaging the first sensor with a first side of the brake rotor and engaging the second sensor with a second side of the brake rotor; and disconnecting the bracket from the caliper housing after measuring the at least one characteristic of the brake rotor.

* * * * *